United States Patent [19]

Gruettner et al.

[11] Patent Number: 5,213,001
[45] Date of Patent: May 25, 1993

[54] POWER TRANSMISSION ELEMENT HAVING INCREASED TORQUE CAPACITY

[75] Inventors: David R. Gruettner, Mequon; Robert J. Gladczak, Milwaukee, both of Wis.

[73] Assignee: UCC Corporation, New Berlin, Wis.

[21] Appl. No.: 818,408

[22] Filed: Jan. 3, 1992

Related U.S. Application Data

[63] Continuation of Ser. No. 526,985, May 21, 1990, abandoned.

[51] Int. Cl.$^5$ .................. F16H 55/12; F16H 3/08; F16H 55/17
[52] U.S. Cl. ........................ 74/451; 74/366; 74/434; 74/DIG. 10; 403/356; 403/358; 403/362
[58] Field of Search ......... 74/366, 434, 451, DIG. 10; 403/320, 355, 356, 358, 362

[56] References Cited

U.S. PATENT DOCUMENTS

| | | | |
|---|---|---|---|
| 2,086,809 | 7/1937 | Kreis | 74/366 X |
| 2,246,517 | 6/1941 | Holister | 74/366 |
| 2,535,382 | 12/1950 | Bachli et al. | 403/362 |
| 2,699,656 | 1/1955 | Anderson et al. | 74/434 X |
| 3,098,399 | 7/1963 | Berthiaume | 74/366 |
| 3,603,624 | 9/1971 | Attermeyer | 403/356 X |
| 4,040,757 | 8/1977 | Pauli | 403/362 X |
| 4,348,132 | 9/1982 | Mullenberg | 403/356 |
| 4,603,597 | 8/1986 | Onorati | 74/434 |
| 4,760,752 | 8/1988 | Wield et al. | 74/434 |

Primary Examiner—Leslie A. Braun
Assistant Examiner—David E. Henn
Attorney, Agent, or Firm—Reinhart, Boerner, Van Deuren, Norris & Rieselbach

[57] ABSTRACT

A thermoplastic power transmission element having increased torque capacity. A power transmission element, such as a gear, pulley, sheave or sprocket, is formed of a thermoplastic material and includes a central hub arranged to surround and engage a keyed driven shaft. A metallic insert within the central hub engages the key to receive the driving forces transmitted therethrough. The metallic insert includes a plurality of mating surfaces engaging the central hub to distribute the driving forces over an area larger than the area of the keyway. Use of the metallic insert increases the torque capacity of the resulting power transmission element.

4 Claims, 1 Drawing Sheet

POWER TRANSMISSION ELEMENT HAVING INCREASED TORQUE CAPACITY

This is a continuation of co pending application Ser. No. 07/526,985 filed on May 19, 1990, now abandoned.

BACKGROUND OF THE INVENTION

This invention relates generally to power transmission elements such as gears, pulleys, sheaves and sprockets and, more particularly, to thermoplastic power transmission elements mountable on a keyed driven shaft.

The use of thermoplastic materials in the manufacture of power transmission elements such as gears, pulleys, sheaves and sprockets greatly reduces manufacturing costs and provides tremendous savings over similar parts made of metal. One particular drawback of this practice, however, is that plastics have considerably lower shear and torsional strengths than most metals.

In power transmission elements, such as gears, pulleys, sheaves and sprockets that are driven from a keyed shaft, the keyway is subject to severe stress and strain during operation. In plastic components, keyway strength is often the ultimate limiting factor in defining the maximum capacity of the power transmission element.

Keyway failure in plastic power transmission elements results from a number of factors including increased notch sensitivity, creep and the reduced impact resistance and rigidity of thermoplastic materials. One common technique for increasing keyway strength in plastic elements is to increase the hub and keyway length. This, however, results in a larger component and is not always a practical solution.

OBJECTS AND SUMMARY OF THE INVENTION

In view of the foregoing, it is a general object of the present invention to provide a new and improved power transmission element such as a gear, pulley, sheave and sprocket.

It is a further object of the present invention to provide a new and improved power transmission element having increased torque capacity.

It is a still further object of the present invention to provide a new and improved thermoplastic power transmission element having increased keyway strength without a corresponding increase in hub and keyway length.

The invention provides a plastic power transmission element mountable on a keyed, driven shaft. The power transmission element includes a central hub having a central aperture for receiving therethrough the keyed shaft. The power transmission element further includes a metallic insert received within the central hub. The metallic insert includes structure for engaging the key of the keyed shaft to receive the driving forces transmitted through the key and distribute the driving forces in an advantageous manner to the central hub.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings wherein like reference numerals identify like elements, and wherein:

DESCRIPTION OF THE PREFERRED EMBODIMENT

Figure 1:
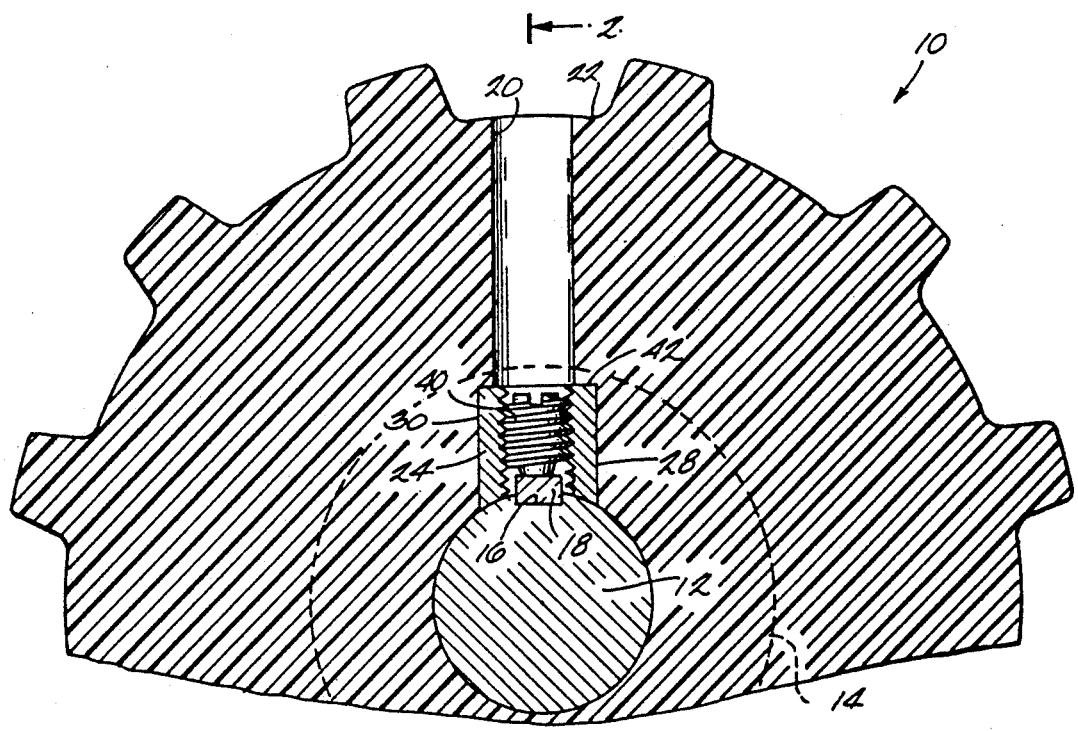
FIG. 1 is a fragmentary sectional view of a thermoplastic power transmission element embodying various aspects of the invention and including a keyway insert for increasing torque capacity of the element.
Figure 2:
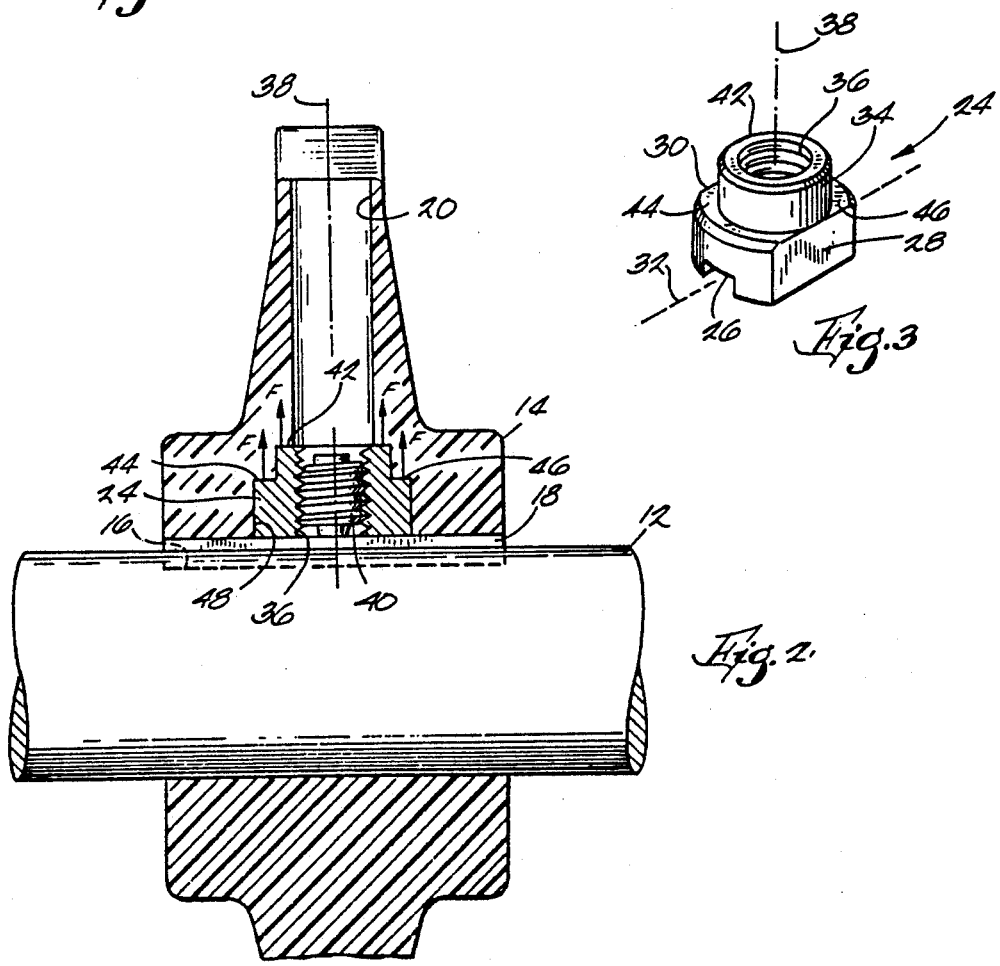
FIG. 2 is another sectional view of the thermoplastic power transmission element shown in FIG. 1.
Figure 3:
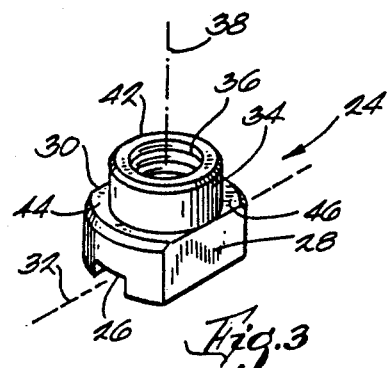
FIG. 3 is a perspective view of a metallic keyway insert constructed in accordance with one aspect of the invention.

Referring to the drawings and in particular to FIGS. 1 and 2, a thermoplastic power transmission element, such as sprocket 10, having increased torque capacity is shown mounted on a keyed drive shaft 12. In the illustrated embodiment, the sprocket 10 is formed of a molded thermoplastic material. It will be appreciated, however, that the power transmission element can also comprise a gear, pulley, sheave or other such device.

As illustrated, the sprocket 10 includes a hub portion 14 adapted to encircle and engage the keyed shaft 12. The shaft 12 includes an axially extending keyway 16 dimensioned to receive therein a metallic key 18 of substantially rectangular cross-section. A radially directed opening 20 is formed in the sprocket 10 and extends from the hub 14 to circumference 22 of the sprocket 10.

To increase the torque capacity of the sprocket 10, means are provided for receiving the drive forces exerted by the key 18 and for transmitting the resulting forces to the thermoplastic material forming the sprocket 10. In the illustrated embodiment, such means comprise an insert 24 formed of a relatively rigid material positioned within the hub 14 at one end of the radially directed opening 20 adjacent the keyway 16. Preferably, the insert is formed of a metal, such as stainless steel. Alternately, another rigid material, such as rigid plastic, can be used. The lower surface of the insert includes a longitudinal channel, or keyway 26, of substantially rectangular section for receiving therein the key 18. The insert 24 further includes a pair of substantially flat, parallel side faces 28, 30 extending substantially parallel to the horizontal longitudinal axis 32 of the keyway or channel 26, but oriented in a substantially vertical plane. An integrally formed, upwardly projecting boss 34 is included as part of the insert 24. The insert 24 further includes a central aperture 26 which opens from the top of the boss 34 and into the keyway long an axis 38 extending substantially perpendicularly to the longitundinal axis 32 of the keyway 26. Preferably, the aperture 36 is internally threaded to receive therein a metallic set screw 40. The top of the boss 34 terminates in an annular flat 42, and a pair of additional flats or ledges 44, 46 are formed where the lower end of the boss 34 joins the remainder of the insert 24. Preferably, a slight chamfer is formed along the outer edges of the flats 42, 44 and 46.

During manufacture, the thermoplastic power transmission element 10 is formed so as to include a recess, or socket, 48 for receiving therein the metallic insert 24. The recess 48 is formed at the inner end of the radially directed opening 20. In addition, the recess 48 is shaped so that the longitudinal axis of the insert 24 lies parallel to the axis of the keyed shaft 12 when the element 24 is in place on the keyed shaft 12. The socket 48 is dimensioned to receive the insert 24 closely herein, and the chamferred edges facilitate installation of the insert 24 into the socket 48. When the set screw 40 is used, it is accessible through the radially directed opening 20.

During use, the set screw 40 within the insert 24 is rotated so as to bear against the key 18 and press the key 18 radially downwardly toward the shaft 12. The radially and upwardly directed reaction forces are transferred through the annular top surface 42 and additional ledge surfaces 44, 46 of the insert 24 to the thermoplastic material in the hub portion 14 of the sprocket. The relatively large bearing surfaces 42, 44 and 46 of the insert 24 thus transmit the resulting forces to the sprocket 10 through a greater area of the thermoplastic material than would be the case if the set screw 40 were threaded directly into the thermoplastic material of the hub 14. By distributing the forces over a greater area, material deformation is minimized with less likelihood that the sprocket 10 will loosen. Along the threads of the set screw 40, where relatively large forces are developed over a relatively small surface area, metal-to-metal contact is therefore maintained.

The metallic insert 24 further serves to transfer rotational forces from the keyed shaft 12 to the sprocket 10. In particular, the flat, parallel side surfaces 28, 30 of the insert 24 distribute the rotational forces developed by the key 18 to a larger surface of the hub material than would be the case if the key 18 were received solely within the thermoplastic material of the hub 14. By thus distributing the forces, further material deformation is avoided. Adjacent to the upper edge of the key 18, where substantial forces may be developed over a relatively small surface area, metal-to-metal contact is once again maintained. Thus, it is seen that use of the metallic insert 24 provides metal-to-metal contact where relatively large forces are developed over relatively small areas. The insert 24 further functions to distribute the resulting forces to much larger areas of the thermoplastic material to avoid areas of localized stress and possible deformation of the thermoplastic material.

Although a particular embodiment of the invention has been described, it will be appreciated that various modifications can be without departing from the spirit of the invention. For example, it is possible to utilize the metallic insert 24 without the set screw 40 or similar element for imparting a compressive force on the key 18. Furthermore, the precise shape of the top and side flat surfaces or the ledges 42, 44 and 46 is not critical. Rather it is only necessary that the bearing surfaces be relatively large compared to the corresponding bearing surfaces in the keyway 26 and in the threaded aperture. Finally, it will be appreciated that the particular power transmission element utilizing the insert 24 is not critical and that the insert can be incorporated into a variety of such elements, such as gears, pulleys, sheaves and sprockets.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. A power transmission assembly comprising a power transmission element mounted on a substantially cylindrical shaft, the shaft defining a cylindrical outer surface and having a keyway of substantially rectangular cross-sectional shape formed in the cylindrical outer surface, said power transmission element comprising:
    a central hub including an aperture for receiving therethrough the shaft;
    a first element embedded within said central hub and having a lower surface positioned and dimensional to lie closely adjacent the cylindrical outer surface of the shaft, said lower surface extending no more than one-half the circumferential distance around the shaft, said lower surface including a keyway of substantially rectangular cross-sectional shape; and
    a second element engaging said first element and oriented substantially perpendicularly to said keyway in said lower surface so that rotation of said second element relative to said first element in one direction moves said second element inwardly toward said keyway in said lower surface and rotation of said second element relative to said first element in the opposite direction moves said second element outwardly away from said keyway in said lower surface, said second element thereby serving to lock a key within a space bounded by said keyway in said lower surface and the keyway in the cylindrical outer surface of the shaft when the shaft is received through said aperture;
    said first and second element each being formed of a material which is relatively nondeformable compared to said central hub
    said first element including a torque transferring surface in contact with said central hub for transferring torque from said first element to said hub in response to rotation of the shaft when the shaft is received through said aperture and the key is secured by said second element.

2. A power transmission element as defined in claim 1 wherein said central hub is formed of plastic and wherein said first and second elements are formed of metal.

3. A power transmission element as defined in claim 2 wherein said torque transferring surface is a substantially flat surface formed on the side of said first element.

4. A power transmission element as defined in claim 2 wherein said second element comprises a set screw.

* * * * *